United States Patent
Clavenna et al.

(10) Patent No.: US 6,521,565 B1
(45) Date of Patent: Feb. 18, 2003

(54) COBALT CATALYST COMPOSITIONS USEFUL FOR CONDUCTING CARBON MONOXIDE HYDROGENATION REACTIONS

(75) Inventors: Leroy Russell Clavenna, Baton Rouge, LA (US); Hyung Suk Woo, Baton Rouge, LA (US); Charles Harrison Mauldin, Baton Rouge, LA (US); William Augustine Wachter, Baton Rouge, LA (US)

(73) Assignee: ExxonMobil Research and Engineering Company, Annadale, NJ (US)

( * ) Notice: Subject to any disclaimer, the term of this patent is extended or adjusted under 35 U.S.C. 154(b) by 0 days.

(21) Appl. No.: 09/630,278

(22) Filed: Aug. 1, 2000

(51) Int. Cl.$^7$ .................. B01J 23/00; B01J 23/32; B01J 23/40; B01J 23/42; B01J 23/72
(52) U.S. Cl. .................. 502/325; 502/324; 502/326; 502/331
(58) Field of Search .................. 502/324–326, 502/331

(56) References Cited

U.S. PATENT DOCUMENTS

| | | | |
|---|---|---|---|
| 2,369,956 A | 2/1945 | Feisst et al. | 260/449.6 |
| 2,499,255 A | * 2/1950 | Parker, Jr. | 196/52 |
| 2,542,558 A | 2/1951 | Naragon et al. | 252/416 |
| 3,661,798 A | 5/1972 | Cosyns et al. | 252/416 |
| 3,839,191 A | 10/1974 | Johnson | 208/108 |
| 3,947,381 A | 3/1976 | Campbell et al. | 252/466 B |
| 4,568,663 A | * 2/1986 | Mauldin | 502/325 |
| 4,978,689 A | 12/1990 | Bell et al. | 518/709 |
| 5,036,032 A | * 7/1991 | Iglesia et al. | 502/260 |
| 5,149,680 A | * 9/1992 | Kitson et al. | 502/185 |
| 5,292,705 A | * 3/1994 | Mitchell | 502/325 |
| 5,495,055 A | 2/1996 | Rueter | 568/881 |
| 5,981,608 A | * 11/1999 | Geerlings et al. | 518/715 |
| 6,130,184 A | * 10/2000 | Geerlings et al. | 502/350 |

FOREIGN PATENT DOCUMENTS

WO  WO 92/06784  4/1992 ............ B01J/37/18

* cited by examiner

Primary Examiner—Mark L. Bell
Assistant Examiner—Patricia L. Hailey
(74) Attorney, Agent, or Firm—Mark D. Marin

(57) ABSTRACT

A catalyst precursor comprising a composite of a solids support, or powder component, and a compound or salt of a metal, or metals component, inclusive of cobalt, is upon reduction rendered catalytically active for conducting hydrogenation reactions, especially carbon monoxide hydrogenation reactions by contact at low temperature with liquid water, or steam, or a mixture of liquid water and steam, sufficient to oxidize and convert the metal, or metals component of the catalyst precursor to a metal hydroxide, low oxygen-containing metal oxide, or mixture of metal hydroxide and low oxygen-containing metal oxide. On reduction, as may be produced by contact and treatment of the oxidized catalyst precursor with hydrogen, the now well dispersed oxide or hydroxylated catalytic metal, or metals component of the catalyst, is reduced to metallic metal, e.g., Co, and the catalyst thereby activated.

14 Claims, No Drawings

COBALT CATALYST COMPOSITIONS USEFUL FOR CONDUCTING CARBON MONOXIDE HYDROGENATION REACTIONS

FIELD OF THE INVENTION

An oxidized catalyst precursor for forming highly active and selective catalysts useful for conducting hydrogenation reactions, particularly carbon monoxide hydrogenation reactions, especially Fischer-Tropsch reactions; and the catalyst produced from the oxidized catalyst precursor.

BACKGROUND

Processes for the hydrogenation of carbon monoxide to produce waxy and/or oxygenated products for upgrading to highly valued chemical raw materials and/or hydrocarbon fuels are well documented in the technical and patent literature. For example, in the Fischer-Tropsch (F-T) process, it is well known that the carbon monoxide component of synthesis gas can be catalytically converted by reaction with the hydrogen to reduction products constituting a range of waxy liquid hydrocarbons; hydrocarbons which can be readily upgraded to transportation fuels. In these processes, e.g., catalysts constituted of Group VIII metals (Periodic Table of the Elements, Sargent-Welch Scientific Company, Copyright 1968), notably the Iron Group metals, particularly iron, ruthenium and cobalt, are generally preferred for the synthesis of $C_5+$ hydrocarbons; and copper has become the catalytic metal of choice for alcohol synthesis. These metals can exist in multiple valence states in the catalyst precursors and each state can display quite different behavior from the others during the reduction treatments, hence impacting the catalytic properties of the active catalyst. Each of the metals can be promoted or modified with an additional metal, or metals, or oxide thereof, to improve, e.g., the activity and/or selectivity of the catalyst in conducting these reactions.

It is known that Iron Group metal surfaces exhibit higher activities for catalytic reactions such as hydrogenation, methanation and F-T synthesis when catalysts on which these metals are dispersed are subjected to high temperature oxidation, and subsequent reduction. Recent art can be found in Applied Catalysis, A, General 175 (1998) pp 113–120 and references therein. U.S. Pat. Nos. 4,492,774; 4,399,234; 4,493,905; 4,585,789; 4,088,671; 4,605,679; 4,670,414 and EPO 253924 disclose activation of cobalt catalysts by means of a reduction/oxidation/reduction (R-O-R) cycle, resulting in an increase in activity for F-T synthesis. Thus, typically such catalyst, e.g., supported reduced Co, is contacted at high temperature ranging from about 300° C. to about 600° C. with a gaseous oxygen-containing stream to oxidize the metal, or metals, to its most stable oxide form, e.g., $Co_3O_4$. Precautions are taken during such treatments to control the exothermicity of the reaction to avoid sintering of the oxide metal particles, which can be detrimental to the activity of the catalyst. On reduction, i.e., on completion of the oxidation-reduction cycle, the dispersed oxide particles, (e.g., the $Co_3O_4$) are reduced to dispersed metal particles and the catalytic activity is increased.

Considerable progress has been made in the development of catalysts, and processes, these providing good activity, and selectivity in alcohol synthesis, and in the conversion of hydrogen and carbon monoxide to distillate fuels, predominantly $C_5+$ linear paraffins and olefins, with low concentrations of oxygenates. Nonetheless, there remains a pressing need for improved catalysts, and processes; particularly more active catalysts, and processes, for producing transportation fuels and lubricants of high quality at good selectivity at high levels of productivity.

SUMMARY OF THE INVENTION

This and other needs are achieved in accordance with the present invention embodying a low temperature oxidation process which requires, beginning with a catalyst precursor constituted of a composite of a solids support, or powder, and a compound or salt of a metal, or metals, inclusive of cobalt, catalytically active for conducting hydrogenation reactions, notably hydrogenation reactions, contacting the catalyst precursor with liquid water or steam, or a mixture of liquid water and steam, at sufficiently low temperature to oxidize and convert at least a portion of the metal, or metals component of the catalyst precursor to a metal hydroxide, low oxygen-containing metal oxide, or mixture of metal hydroxide and low oxygen-containing metal oxide. By oxidation is meant the conversion of a metal species to a low valence state, e.g., Co, the Co species, to a $Co^{2+}$ species. For example, in a low temperature oxidation treatment of a cobalt/$TiO_2$ catalyst precursor treated with liquid water or steam, or a mixture of liquid water and steam, all or a portion of the cobalt component of the catalyst precursor is oxidized and converted to $Co^{2+}$, i.e., a hydroxide of cobalt, $Co(OH)_2$, low oxide of cobalt, CoO, or mixture of these components; these components becoming intimately contacted with the surface of the support, or powder. On reduction, as may be produced by contact and treatment of the oxidized catalyst precursor with hydrogen, the dispersed metal oxide or hydroxylated catalytic metal, or metals component of the catalyst, e.g., CoO or $Co(OH)_2$, or mixture thereof, is reduced to elemental or metallic metal, e.g., Co; and the catalyst thereby activated. Optionally, the oxidized catalyst precursor may be dried in a non-oxidizing atmosphere and the hydroxide converted to a low oxygen content oxide, i.e., CoO. Optionally also, the oxidized catalyst precursor may be dried and calcined at elevated temperature in an oxidizing atmosphere to obtain a metal oxide or metal oxides, e.g., $Co_3O_4$. In both options, the catalyst is activated by reduction of the oxidized catalyst precursor. The oxidized catalyst precursor, and catalyst made therefrom are useful compositions of matter, the activated catalyst being particularly useful for efficiently conducting hydrogenation reactions, notably carbon monoxide hydrogenation, especially F-T synthesis reactions, to provide a variety of useful products.

The composition, comprising the support and catalytic metal, or metals component, on contact with the water or steam, or mixed phase water and steam, at low temperature is transformed: the catalytic metal(s), component of the catalyst, e.g., Co, is oxidized and converted into metal hydroxides, low oxygen-containing metal oxides, or metal hydroxides admixed with oxides of the metal in low valence state, e.g., CoO, $Co(OH)_2$. It is found that the transformed metal, or metals, e.g., CoO or $Co(OH)_2$, is more readily, widely and intimately dispersed on the surface of the support than a higher valence more stable oxide form, e.g., $Co_3O_4$; providing on reduction smaller crystallites of the metal, or metals which are a more highly active species than is produced by reducing $Co_3O_4$ to form the catalyst. The greater activity and stability of catalysts made by this process, and the fact that the oxidation step can be carried out at low temperature in an aqueous medium, or by simple contact with liquid water, or steam, or mixed phase of water and steam, are consequences of considerable import in the development of an F-T process.

The catalytic metal(s) of the catalyst precursor, on contact with the oxidizing liquid water or steam, or mixture thereof, converts at low temperature to its hydroxide or low valence oxide. Reactions taking place in this conversion for a cobalt based catalyst precursor thus include the following:

$$Co + H_2O \Longleftrightarrow CoO + H_2 \qquad (1)$$

$$CoO + H_2O \Longleftrightarrow \text{``}Co(OH)_2\text{''}, \qquad (2)$$

or the sum of reaction 1 and reaction 2:

$$Co + 2H_2O \Longleftrightarrow \text{``}Co(OH)_2\text{''} + H_2 \qquad (3)$$

The hydroxide of cobalt is shown as "$Co(OH)_2$" in the above equations since its exact form can be more complicated than the pure metal hydroxide because with the low temperature treatment with liquid water or steam, the hydroxide of cobalt that is formed can interact with the support material (e.g., the $TiO_2$). The oxidation of the metal, as depicted in reactions 1 and 3, with liquid water or steam is considerable less exothermic than the oxidation of the metal directly with molecular oxygen. In addition, the exothermicity of the oxidation reaction is effectively moderated by the presence of excess water; especially liquid water. The metal hydroxide or oxy-anion(s) are intimately dispersed on the surface of the support, hence providing upon reduction with hydrogen or a hydrogen-containing gas small crystallites of the metal, or metals which are highly active species for carbon monoxide hydrogenation. Optionally, when the hydroxylated catalyst precursor is calcined, the metal hydroxide or low valence oxide particles are further oxidized to small oxide particles without the deleterious effect of the intense exothermic reaction of directly converting a reduced metal to the higher valence oxide, e.g., Co metal to $Co_3O_4$.

DETAILED DESCRIPTION

In the low temperature liquid water or steam oxidation treatment at least a portion of the catalytic metal component of the catalyst precursor is oxidized to lower valence metal hydroxide or oxide by contact with liquid water or steam at temperatures ranging from about 25° C. to about 275° C., preferably from about 100° C. to about 250° C., most preferably from about 150° C. to about 225° C., at not less than autogenous pressure, or pressures ranging from about 1 atmosphere (atm) to about 50 atm, preferably from about 1 atm to about 20 atm, for periods ranging from about 0.1 hour to about 24 hours, preferably from about 0.25 hour to about 10 hours; or until loss of pyrophoricity. In a preferred mode of practicing this invention the catalyst precursor is dispersed or slurried in the liquid water, e.g., by containment in a reaction vessel, or autoclave. The metal, or metals, component of the catalyst precursor treated in such manner is transformed at the low temperature into a low oxygen-containing metal oxide or metal hydroxide, or mixture thereof. As will be recognized, the contacting time will be sufficient as required to obtain the desired amount of oxidation. Depending upon the design of the process, e.g., fixed bed, slurry bubble, etc., the amount of water used varies greatly. For example, in a fixed bed operation, the water either in a liquid or steam phase or both is added in a flow-through mode. Typically, the fixed bed is fed water continuously which fills the void volume of the bed. This continuous feed of water has the added effect of sweeping out of the reactor gaseous reaction products (e.g., $H_2$) and, thus, drives reactions 1 and 3 to the right as oxidized metal products. For an operation associated with the use of a bubble column or a moving bed, the water oxidation may be carried in a batch or continuous mode. Regardless of the method use, the weight of water to the weight of catalyst varies typically from about 1:5 to about 100:1, preferably from about 1:1 to about 50:1, and most preferably from about 2:1 to about 10:1.

In the low temperature water or steam treatment, a significant portion of the catalytic metal component of the catalyst precursor is thus oxidized to metal hydroxides or lower metal oxides, whereas high temperature oxidation with a molecular oxygen containing non-hydrated gas stream as described in the prior art, produces essentially complete oxidation of the metals component to the most stable oxide phase. For example, in the treatment of the catalyst precursor with liquid water or steam, or mixture thereof, the Co metal species is oxidized to CoO, $Co(OH)_2$, or both CoO and $Co(OH)_2$ rather than $Co_3O_4$. The catalyst precursor composition containing the $Co^{2+}$ metal oxidized species provides significantly different behavior from the composition obtained by conventional high temperature oxidation of the catalyst precursor with the non-hydrated oxygen containing gas.

The catalyst precursor subjected to the low temperature oxidation treatment and used in accordance with this invention is characterized as the composite of a solid support, or powder component and a compound or salt of a catalytic metal, or metals component, inclusive of cobalt, formed by gellation, cogellation or impregnation techniques; e.g., precipitation of gels and cogels by the addition of a compound, or compounds of the catalytic metal, or metals, from solution as by addition of a base, or by the impregnation of a particulate solids support, or powder, with a solution containing a compound or salt of the catalytic metal, or metals; techniques well known to those skilled in this art. The catalytic precursor within the meaning of this invention is thus the harbinger composition which, when the compound(s) or salt(s) of the catalytic metal, or metals, inclusive of cobalt, is oxidized, by contact with water or steam, or mixture of water and steam and then reduced, as by contact with hydrogen, is comprised of sufficient of the dispersed reduced catalytic metal, or metals, that it is useful in catalyzing hydrogenation reactions. In such preparation procedures a metal, or metals, inclusive of cobalt, catalytically active for conducting hydrogenation reactions, is composited with a particulate solids support, or powder, suitably a refractory inorganic oxide support, preferably a crystalline aluminosilicate zeolite, natural or synthetic, alumina, silica, silica-alumina, titania, zirconia or zirconia-silicates, or mixtures of these oxides, or the like. For example, in impregnating a particulate support, or powder, the support or powder is contacted with a solution containing a salt, or compound of cobalt; and if desired, an additional metal, or metals, preferably a Group VIIB or Group VIII metal, or metals, of the Periodic Table of the Elements, or copper or thorium can be used to further modify or promote the catalytic reaction. Generally, from about 2 percent to about 70 percent, preferably from about 5 percent to about 50 percent metallic metal, or metals, inclusive of cobalt, is deposited upon the particulate solids support or powder, based upon the total weight (wt. %; dry basis) of the catalyst precursor (or the finished catalyst). Catalysts having a relatively high metal, or metals, loading are preferred because these catalysts can be loaded into slurry bubble columns over a broad range of concentrations for activation, and use for conducting F-T reactions up to that high concentration in which mixing and pumping the slurry becomes limiting. The impregnated powder or support may then be contacted with a reducing agent, suitably hydrogen at elevated temperature, to reduce the metal component to its low valence state, generally to metallic metal.

In conducting the low temperature oxidation treatment of a catalyst precursor, a preferred procedure is generally as follows:

The catalyst precursor is slurried in liquid water; the slurry of water:catalyst precursor being contained in the reactor in volume ratio of at least about 0.5:1, preferably at least about 2:1, and higher. A temperature ranging from about 25° C. to about 275° C., preferably from about 100° C. to about 250° C., most preferably from about 150° C. to about 225° C., and a total reaction pressure ranging from about 1 atm to about 50 atm, preferably from about 1 atm to about 20 atm is maintained. The contact time between the catalyst precursor, or deactivated catalyst and the water ranges generally from about 0.01 hour to about 40 hours, more preferably from about 0.1 to about 10 hours, and most preferably ranges from about 0.2 hours to about 2 hours, or up to the point in time where the oxidized catalyst precursor, or catalyst, loses its pyrophoricity.

The catalyst precursor in the slurry is next separated from the water by evaporating or by filtering off the excess water and drying, and may then be further treated, or reduced as by contact with hydrogen, or a hydrogen-containing gas, at elevated temperature, preferably at temperature ranging from about 200° C. to about 600° C., preferably from about 300° C. to about 450° C., at hydrogen partial pressures ranging from about 0.1 atm to about 100 atm, preferably from about 1 atm to about 40 atm, sufficient to convert the metal hydroxide, low oxygen-containing metal oxide, or mixture thereof to essentially the zero valent state, i.e., metallic metal.

The catalysts, or oxidized catalyst precursors after they have been reduced are used in a hydrogenation process, preferably a carbon monoxide hydrogenation process, particularly one wherein liquid, gaseous or solid hydrocarbon products are formed by contacting a synthesis gas comprising a mixture of $H_2$ and CO with the F-T hydrocarbon conversion catalyst of this invention under water gas shifting or non-shifting conditions; but preferably non-shifting conditions in which little or no water gas shift reaction occurs, particularly when the catalytic metals comprise Co and Re or Ru or mixtures of one or both of these latter metals with cobalt.

The following examples are illustrative of the salient features of the invention. All parts, and percentages, are given in terms of weight unless otherwise specified.

EXAMPLE 1

In this example the existence of a hydroxylated surface species after water treatment of a supported catalyst is characterized by Fourier Transformed Infrared (FTIR) spectroscopy. The catalyst treated was 11.2% Co and 0.67% Re on a $TiO_2$ (rutile) support.

The catalyst was water treated in a fixed bed flow reactor. In the treatment, 3.7 g of the catalyst was loaded in the reactor and reduced with $H_2$ at 375° C. and atmospheric pressure for 1 hr. The sample was then cooled to 170° C. and treated in steam at 280 psig with a water feed rate of 100 g/hr and a $N_2$ purge rate of 30 cc/hr. After the treatment the treated catalyst was passivated in the reactor with 0.5 mole % $O_2$ in $N_2$ at atmospheric pressure and room temperature. The FTIR measurement was performed in a Nicolet® 700SX spectrometer using a SpectraTech® diffusive reflectance IR cell. Absorbance due to the hydroxyl band was detected at about 3628 $cm^{-1}$. The tabulation below shows the relative intensity of the hydroxyl absorbance for pure $Co(OH)_2$, the water treated catalyst, and the water treated catalyst after reduction in $H_2$ at 200° C. and at 300° C. for 2 hrs. As would be expected the hydroxide on the supported catalyst is substantially lower than that of pure $Co(OH)_2$ but appears at the same peak position. FTIR of the blank support does not have a peak at this position. Reducing the sample at 200° C., has little effect on the hydroxyl peak. However, it is found that the hydroxyl groups in pure $Co(OH)_2$ decomposes and are completely lost at 200° C. The greater stability of the supported cobalt hydroxide as contrasted with the pure cobalt hydroxide indicates a different chemical nature of the supported cobalt hydroxide. As shown by the data, reducing the water treated catalyst at the higher temperature of 300° C., decomposes the majority of the hydroxide.

| Sample | Peak Position, $cm^{-1}$ | Relative Peak Area From FTIR |
|---|---|---|
| Pure $Co(OH)_2$ | 3628 | 1000 |
| Water treated catalyst | 3628 | 26 |
| Water treated catalyst reduced at 200° C. | 3621 | 31 |
| Water treated catalyst reduced at 300° C. | 3607 | 5 |

EXAMPLE 2

This example shows that water treatment leads to increased $O_2$ chemisorption which is indicative of increased metals surface area and leads to increased catalytic activity as measured for CO hydrogenation. The catalyst sample and water treatment is as described in Example 1.

In the $O_2$ chemisorption, the catalyst was reduced in $H_2$ at 450° C. and cooled to room temperature. $O_2$ was pulsed in a He carrier to the reduced catalyst and the quantity of $O_2$ uptake was determined. The CO hydrogenation activity was measured at a nominal conversion of 50–60% in a fixed bed tubular reactor after 24 hrs of operation at 200° C. and 280 psig with a gas feed containing a relative molar concentration of $H_2$:CO:He=64:32:4. The data tabulated below shows the $O_2$ chemisorption and CO conversion rate relative to the starting, untreated catalyst. For the starting catalyst (untreated), the $O_2$ chemisorption was 284 $\mu$-moles $O_2$/g of catalyst and the rate of CO conversion was 10.9 m-moles CO/g catalyst/hr.

| Sample | Relative $O_2$ Chemisorption | Relative Rate of CO Hydrogenation |
|---|---|---|
| Untreated catalyst | 1.00 | 1.00 |
| Water treated catalyst | 1.72 | 1.78 |

As shown, the water treatment increased the $O_2$ chemisorption and also resulted in a corresponding increase in catalytic activity for CO hydrogenation.

EXAMPLE 3

This example shows the utility of the water treatment to increase $O_2$ chemisorption and identifies preferred water treatment conditions. The catalyst treated was 11.2% Co and 0.67% Re on a $TiO_2$ (rutile) support; the supported metals on this catalyst having been reduced and passivated in air. The water treatment was in a 316 SS closed mini-reactor that had an internal volume of about 12.7 ml.

In the treatment 2.0 g of the catalyst and 4.0 ml of distilled/deionized water were added to the reactor and mixed to insure wetting of the catalyst. The reactor was then evacuated and flushed with $N_2$ ten times and then filled to atmospheric pressure with nitrogen and sealed. The mini-reactor was immersed in a preheated fluidized sandbath to achieve rapid heatup to the target temperature. The contents of the mini-reactor was within 15° C. of target temperature in 5 min. After the desired treatment time at temperature, the mini-reactor was removed from the sandbath and cooled by water quenching. The catalyst was then filtered and vacuum dried over night at room temperature. The $O_2$ chemisorption was performed as described in above. For the starting (untreated) catalyst used in this example, the $O_2$ chemisorption was 278 $\mu$-moles/g of catalyst. The data tabulated below shows the $O_2$ chemisorption relative to the starting catalyst after water treatment of the catalyst at temperatures ranging from 75° C. to 250° C. and treatment times of 15 min, 120 min, and 960 min. Examining these results indicate that the temperature was more important than the treatment times examined. The average $O_2$ chemisorption obtained for the various treatment temperatures is shown in the last column of the tabulation. It is shown that increased dispersion is obtained at all temperatures from 75° C. to 250° C. The treatment optimum between about 180° C. and 200° C.

| | $O_2$ Chemisorption, Relative to Starting Material Treatment Time | | | |
|---|---|---|---|---|
| Temp., ° C. | 15 min | 120 min | 960 min | Average |
| Untreated | 1.00 | 1.00 | 1.00 | 1.00 |
| 75 | 1.42 | 1.60 | 1.70 | 1.57 |
| 105 | 1.68 | 1.89 | 1.80 | 1.79 |
| 130 | 1.70 | 1.74 | 1.91 | 1.79 |
| 160 | 1.76 | 2.32 | 1.68 | 1.92 |
| 182 | 2.37 | 2.22 | 2.25 | 2.28 |
| 205 | 2.23 | 2.32 | 2.27 | 2.28 |
| 226 | 1.86 | 1.62 | 2.00 | 1.83 |
| 250 | 1.52 | 1.19 | 1.29 | 1.33 |

EXAMPLE 4

This example further characterizes the hydroxyl groups in the water treated samples. The catalyst treated was 11.2% Co and 0.67% Re on a $TiO_2$ (rutile) support; the supported metals on this catalyst having been reduced and passivated in air. The water treatment was in a 316 SS closed mini-reactor that had an internal volume of about 12.7 mil.

In the treatment 1.0 g of the catalyst and 3.0 ml of distilled/deionized water were added to the reactor and mixed to insure wetting of the catalyst. The reactor was then evacuated and filled to atmospheric pressure with nitrogen and sealed. The sealed reactor was then placed in a furnace preheated to the target temperature. The reactor was removed when the internal temperature of the reactor reached the target temperature. The temperatures examined were between 105° C. and 250° C. The reactor was then quenched with water. The catalyst was then filtered and vacuum dried over night at room temperature. About 75 mg of the treated catalyst was loaded in a tubular reactor and analyzed by Temperature Programmed Reduction (TPR). In the TPR the sample was heated in a 5 mole % $H_2$ in Ar stream at 10° C./min and the hydrogen consumed was determined by monitoring the hydrogen in the effluent using a thermal conductivity detector while the water formed was determined using a mass spectrometer. If water were detected without hydrogen consumption at a temperature above where physical adsorbed water would evolve from the catalyst (temperatures greater than about 150° C.), this would show that a hydroxide is being decomposed. However, if water were detected with a corresponding hydrogen consumption, this would show that a metal oxide is being reduced by the hydrogen to form water. Analyzing the TPR spectra using this criteria, the relative amounts of hydroxide tp reducible oxide in the samples was determined. For this analysis water evolution between 200° C. and 325° C. was used to determine the amount of hydroxide decomposition. The tabulation below shows the results.

| Water Treatment Temp., ° C. | (OH)/Oxide |
|---|---|
| 105 | 0.51 |
| 120 | 0.69 |
| 150 | 0.77 |
| 165 | 0.79 |
| 175 | 0.76 |
| 182 | 0.63 |
| 205 | 0.53 |
| 225 | 0.78 |
| 250 | 0.44 |

As shown, hydroxide formation was observed at all the treatment temperatures, the relative amount of hydroxide formed with water treatment between 120° C. and 225° C. being the highest.

The hydrocarbons produced in a process utilizing the catalysts of this invention are typically upgraded to more valuable products by subjecting all or a portion of the $C_5+$ hydrocarbons to fractionation and/or conversion. By "conversion" is meant one or more operations in which the molecular structure of a least a portion of the hydrocarbon is changed and includes both non-catalytic processing, e.g., steam cracking, and catalytic processing, e.g., catalytic cracking, in which the portion, or fraction, is contacted with a suitable catalyst. If hydrogen is present as a reactant, such process steps are typically referred to as hydroconversion and variously as hydroisomerization, hydrocracking, hydrodewaxing, hydrorefining and the like. More rigorous hydrorefining is typically referred to as hydrotreating. These reactions are conducted under conditions well documented in the literature for the hydroconversion of hydrocarbon feeds, including hydrocarbon feeds rich in paraffins. Illustrative, but non-limiting, examples of more valuable products from such feeds by these processes include synthetic crude oil, liquid fuel, emulsions, purified olefins, solvents, monomers or polymers, lubricant oils, medicinal oils, waxy hydrocarbons, various nitrogen- or oxygen-containing products and the like. Examples of liquid fuels includes gasoline, diesel fuel and jet fuel, while lubricating oil includes automotive oil, jet oil, turbine oil and the like. Industrial oils include well drilling fluids, agricultural oils, heat transfer oils and the like.

Having described the invention, what is claimed is:

1. As a composition of matter, an oxidized catalyst precursor which comprises a composite comprising a particulate solids component and a supported cobalt component at least a portion of the supported cobalt component is comprised of a dispersion of at least one member selected from the group consisting of cobalt metal hydroxide, a low valence cobalt metal oxide, or a mixture of a cobalt metal hydroxide and a low valence cobalt metal oxide, wherein the cobalt has a lower valence and is more widely dispersed on the surface of the support than $Co_3O_4$;

which on reduction forms a catalyst which becomes catalytically active for conducting hydrogenation reactions.

2. The composition of claim 1 wherein the cobalt component of the catalyst precursor is present in concentration ranging from about 2 percent to about 70 percent, based on the total weight of the catalyst precursor (dry basis).

3. The composition of claim 2 wherein the cobalt component of the catalyst precursor is present in concentration ranging from about 5 percent to about 50 percent.

4. The composition of claim 1 wherein the metal, or metals component of the catalyst precursor is comprised of cobalt and a Group VIIB or Group VIII metal other than cobalt, cobalt and thorium, or cobalt and copper.

5. The composition of claim 1 wherein the metal, or metals component of the catalyst precursor is comprised of cobalt and rhenium, or cobalt and ruthenium.

6. The composition of claim 1 wherein the particulate solids component of the catalyst precursor is comprised of a refractory inorganic oxide.

7. The composition of claim 6 wherein the particulate solids component is comprised of a crystalline aluminosilicate zeolite, alumina, silica, silica-alumina, titania, zirconia, zirconia-silicates, or mixtures of these oxides.

8. As a composition of matter, a catalyst precursor which comprises the reaction product of a composite comprising a particulate solids component and a supported cobalt component at least a portion of the supported cobalt component is comprised of a dispersion of at least one member selected from the group consisting of cobalt metal hydroxide, a low valence cobalt metal oxide, or a mixture of a cobalt metal hydroxide and a low valence cobalt metal oxide, wherein the cobalt has a lower valence and is more widely dispersed on the surface of the support than $Co_3O_4$;

contacted with hydrogen or a hydrogen-containing gas at temperature sufficient to reduce the cobalt metal hydroxide, low valence cobalt metal oxide; or mixture of cobalt metal hydroxide and low valence cobalt metal oxide, to form a catalyst which is catalytically active for conducting hydrogenation reactions.

9. The composition of claim 8 wherein the cobalt component of the catalyst is present in concentration ranging from about 2 percent to about 70 percent, based on the total weight of the composite (dry basis).

10. The composition of claim 9 wherein the cobalt component of the catalyst is present in concentration ranging from about 5 percent to about 50 percent.

11. The composition of claim 8 wherein the cobalt component of the catalyst is comprised of cobalt and a Group VIIB or Group VIII metal other than cobalt, cobalt and thorium, or cobalt and copper.

12. The composition of claim 11 wherein the metal, or metals component of the catalyst is comprised of cobalt and rhenium, or cobalt and ruthenium.

13. The composition of claim 8 wherein the particulate solids component of the catalyst is comprised of a refractory inorganic oxide.

14. The composition of claim 13 wherein the particulate solids component is comprised of a crystalline aluminosilicate zeolite, alumina, silica, silica-alumina, titania, zirconia, zirconia-silicates, or mixtures of these oxides.

* * * * *